(12) United States Patent
Anjum et al.

(10) Patent No.: US 12,530,324 B2
(45) Date of Patent: Jan. 20, 2026

(54) EDIT INTERFACE IN AN ONLINE DOCUMENT SYSTEM

(71) Applicant: DocuSign, Inc., San Francisco, CA (US)

(72) Inventors: Iqra Anjum, San Francisco, CA (US); Marshall Nam, San Francisco, CA (US); Caitlan Corbin, San Francisco, CA (US); Chad Roffey, San Francisco, CA (US)

(73) Assignee: Docusign, Inc., San Francisco, CA (US)

( * ) Notice: Subject to any disclaimer, the term of this patent is extended or adjusted under 35 U.S.C. 154(b) by 0 days.

(21) Appl. No.: 18/502,876

(22) Filed: Nov. 6, 2023

(65) Prior Publication Data
US 2024/0104060 A1    Mar. 28, 2024

Related U.S. Application Data

(63) Continuation of application No. 17/850,054, filed on Jun. 27, 2022, now abandoned, which is a continuation of application No. 17/085,980, filed on Oct. 30, 2020, now Pat. No. 11,379,424.

(51) Int. Cl.
*G06F 16/176* (2019.01)
*G06F 40/166* (2020.01)
*G06Q 50/18* (2012.01)
*G06F 16/16* (2019.01)

(52) U.S. Cl.
CPC ........ *G06F 16/1774* (2019.01); *G06F 40/166* (2020.01); *G06Q 50/188* (2013.01); *G06F 16/168* (2019.01)

(58) Field of Classification Search
CPC .. G06F 16/1774; G06F 40/166; G06F 16/168; G06Q 50/188
See application file for complete search history.

(56) References Cited

U.S. PATENT DOCUMENTS

| | | | | |
|---|---|---|---|---|
| 5,867,160 A | * | 2/1999 | Kraft, IV | G06F 9/542 718/103 |
| 5,892,511 A | * | 4/1999 | Gelsinger | G06F 3/0481 715/803 |
| 6,411,988 B1 | * | 6/2002 | Tafoya | H04L 12/1813 709/248 |
| 6,539,421 B1 | * | 3/2003 | Appelman | H04L 51/04 709/206 |

(Continued)

*Primary Examiner* — Nicholas Augustine
(74) *Attorney, Agent, or Firm* — KDW FIRM PLLC

(57) ABSTRACT

An online document system can allow users to participate in collaborative negotiation of documents stored with in the online document system. To facilitate negotiations between multiple entities (each potentially including multiple users with different roles in the negotiation), the online document system includes a permissions system that allows per-clause control over user's access to propose and approve changes to a negotiated document. Similarly, the user interfaces for viewing a negotiated document provided by the online document system to users can depend on the role of that user in editing the document and the current stage of the negotiation of the document. Finally, the online document system can track agreement between sides in a negotiation on a per-clause basis and can otherwise help facilitate the negotiation of the document.

20 Claims, 11 Drawing Sheets

(56) References Cited

U.S. PATENT DOCUMENTS

| | | | | |
|---|---|---|---|---|
| 7,047,279 B1* | 5/2006 | Beams | | G06Q 10/10 709/248 |
| 7,124,164 B1* | 10/2006 | Chemtob | | H04L 12/1831 709/204 |
| 7,124,372 B2* | 10/2006 | Brin | | H04L 12/1822 715/757 |
| 7,197,638 B1* | 3/2007 | Grawrock | | G06F 21/6218 726/30 |
| 7,280,991 B1* | 10/2007 | Beams | | G09B 7/04 706/46 |
| 7,590,941 B2* | 9/2009 | Wee | | H04N 7/15 715/755 |
| 8,484,578 B2* | 7/2013 | Gordner | | G06F 3/0482 715/705 |
| 9,418,356 B2* | 8/2016 | Crevier | | H04L 61/4555 |
| 9,473,532 B2* | 10/2016 | Pearl | | G06F 21/554 |
| 9,652,741 B2* | 5/2017 | Goldberg | | G06F 16/178 |
| 9,715,534 B2* | 7/2017 | Beausoleil | | G06F 3/04847 |
| 10,007,405 B2* | 6/2018 | D'Amore | | G06Q 10/101 |
| 10,394,691 B1* | 8/2019 | Cole | | G06F 11/079 |
| 2002/0002562 A1* | 1/2002 | Moran | | G06F 16/40 707/E17.009 |
| 2002/0056003 A1* | 5/2002 | Goswami | | G06F 9/54 709/227 |
| 2002/0163548 A1* | 11/2002 | Chiu | | G11B 27/28 715/864 |
| 2003/0023686 A1* | 1/2003 | Beams | | G09B 5/14 709/205 |
| 2004/0163050 A1* | 8/2004 | Matter | | G06F 40/123 715/255 |
| 2004/0169683 A1* | 9/2004 | Chiu | | G11B 27/105 715/776 |
| 2004/0172395 A1* | 9/2004 | Edelstein | | G06F 16/1774 707/999.009 |
| 2004/0201602 A1* | 10/2004 | Mody | | G05B 19/409 715/700 |
| 2005/0021780 A1* | 1/2005 | Beyda | | G06F 21/6218 709/229 |
| 2005/0086596 A1* | 4/2005 | Koch | | G06F 40/174 715/256 |
| 2005/0138068 A1* | 6/2005 | Wilbur | | G06F 16/2358 |
| 2005/0257160 A1* | 11/2005 | DeBellis | | G06F 3/0481 715/754 |
| 2006/0064634 A1* | 3/2006 | Dettinger | | G06F 16/10 715/255 |
| 2006/0075071 A1* | 4/2006 | Gillette | | H04L 67/06 709/219 |
| 2006/0080278 A1* | 4/2006 | Neiditsch | | H04L 51/42 |
| 2006/0149567 A1* | 7/2006 | Muller | | G06Q 10/10 705/1.1 |
| 2006/0190391 A1* | 8/2006 | Cullen, III | | G06Q 10/10 705/37 |
| 2006/0206370 A1* | 9/2006 | Skopal | | G06Q 10/06 718/102 |
| 2006/0253542 A1* | 11/2006 | McCausland | | H04L 51/04 709/207 |
| 2007/0078930 A1* | 4/2007 | Ludwig | | H04L 12/1818 709/204 |
| 2007/0100712 A1* | 5/2007 | Kilpatrick | | G06Q 10/06 705/29 |
| 2007/0136662 A1* | 6/2007 | Khaba | | G06F 40/166 715/202 |
| 2007/0156670 A1* | 7/2007 | Lim | | H04L 63/205 |
| 2007/0191979 A1* | 8/2007 | Zeng | | G06Q 10/02 700/97 |
| 2007/0244906 A1* | 10/2007 | Colton | | G06F 40/166 |
| 2008/0091846 A1* | 4/2008 | Dang | | G06F 40/174 709/246 |
| 2008/0098295 A1* | 4/2008 | Nelson | | H04L 65/403 715/233 |
| 2008/0120126 A1* | 5/2008 | Bone | | G06Q 10/10 706/45 |
| 2008/0263629 A1* | 10/2008 | Anderson | | H04L 9/3213 726/2 |
| 2008/0301261 A1* | 12/2008 | Nakazawa | | G06F 16/93 709/219 |
| 2009/0089625 A1* | 4/2009 | Kannappan | | G06Q 10/10 714/39 |
| 2010/0070970 A1* | 3/2010 | Hu | | G06F 9/45533 718/1 |
| 2010/0138756 A1* | 6/2010 | Saund | | H04L 51/216 715/758 |
| 2010/0180213 A1* | 7/2010 | Karageorgos | | G06F 16/93 715/764 |
| 2010/0205537 A1* | 8/2010 | Knighton | | H04L 12/1831 715/751 |
| 2010/0228750 A1* | 9/2010 | Solin | | G06F 16/1734 707/755 |
| 2010/0229085 A1* | 9/2010 | Nelson | | G06F 40/186 715/255 |
| 2010/0235750 A1* | 9/2010 | Noland | | H04L 41/22 709/221 |
| 2010/0241972 A1* | 9/2010 | Spataro | | G06F 16/93 715/753 |
| 2010/0332980 A1* | 12/2010 | Sun | | G06F 3/04815 715/706 |
| 2011/0167353 A1* | 7/2011 | Grosz | | G06F 15/16 715/738 |
| 2011/0239129 A1* | 9/2011 | Kummerfeld | | G06F 3/0488 715/750 |
| 2011/0239135 A1* | 9/2011 | Spataro | | G06Q 10/10 715/753 |
| 2012/0089610 A1* | 4/2012 | Agrawal | | G06F 16/20 707/741 |
| 2012/0233205 A1* | 9/2012 | McDermott | | G06F 16/93 715/255 |
| 2012/0240061 A1* | 9/2012 | Hillenius | | G06Q 10/06398 715/753 |
| 2012/0260195 A1* | 10/2012 | Hon | | G06F 16/954 715/753 |
| 2012/0296790 A1* | 11/2012 | Robb | | G06Q 40/06 715/741 |
| 2012/0331394 A1* | 12/2012 | Trombley-Shapiro | | H04L 67/06 715/748 |
| 2013/0019028 A1* | 1/2013 | Myers | | G06F 40/197 709/246 |
| 2013/0080919 A1* | 3/2013 | Kiang | | H04L 67/63 715/753 |
| 2014/0082071 A1* | 3/2014 | Rexer | | G06F 16/192 709/204 |
| 2015/0310188 A1* | 10/2015 | Ford | | H04L 63/101 726/28 |
| 2016/0378735 A1* | 12/2016 | Mullins | | G06T 11/206 715/212 |
| 2017/0270022 A1* | 9/2017 | Moresmau | | G06F 11/302 |
| 2018/0089561 A1* | 3/2018 | Oliner | | G06F 16/2471 |
| 2019/0034395 A1* | 1/2019 | Curry | | G06F 40/166 |
| 2019/0207969 A1* | 7/2019 | Brown | | G06F 21/552 |
| 2019/0303349 A1* | 10/2019 | Burshteyn | | H04L 9/0891 |
| 2020/0104518 A1* | 4/2020 | Parker | | G06F 21/6209 |
| 2020/0125796 A1* | 4/2020 | Pirhonen | | G06F 16/176 |
| 2020/0193263 A1* | 6/2020 | Pham | | H04L 41/22 |
| 2020/0204608 A1* | 6/2020 | Kisin | | G06F 40/197 |
| 2020/0335064 A1* | 10/2020 | Greco | | G06F 3/0485 |
| 2020/0389313 A1* | 12/2020 | Singh | | H04L 9/0637 |

* cited by examiner

DOCUMENT TITLE

This Sales Agreement is for the purchase of engineering consulting services between Fresh Soft ("Fresh Software") and Customer Inc. ("Customer"). The parties hereby agree to the foregoing and as follows:

Herein, Customer has agreed to purchase services which will be made available with upgraded support.

For the purposes of this Agreement, the customer will be under the state law of California, and the consulting services will be as follows:

Clause 320A
Clause 320B

Document Viewing Area 310

Document Editing Interface 300

Permission Definition 330A
Full Edit:
Internal User 340A
Internal User 340B
...
Locked:
External User 350A
...

Permission Definition 330B
Full Edit:
Internal User 340A
...
Approved Edit:
Internal User 340B
...

FIG. 3

DOCUMENT TITLE

This Sales Agreement is for the purchase of engineering consulting services between Fresh Soft ("Fresh Software") and Customer Inc. ("Customer"). The parties hereby agree to the foregoing and as follows:

[Agreed] Herein, Customer has agreed to purchase services which will be made available with standard support

[Approved (Entity 650)] For the purposes of this Agreement, the customer will be under the state law of California, and the consulting services will be as follows:

Document Viewing Area 610
Clause 620A
Clause 620B
Clause State Indicator 630A
Clause State Indicator 630B
Negotiation Status Interface 600

FIG. 6

EDIT INTERFACE IN AN ONLINE DOCUMENT SYSTEM

CROSS REFERENCE TO RELATED APPLICATIONS

This application is a continuation of and claims priority to U.S. patent application Ser. No. 17/850,054, filed Jun. 27, 2022, which is a continuation of and claims priority to U.S. patent application Ser. No. 17/085,980, filed Oct. 30, 2020, now U.S. Pat. No. 11,379,424, issued on Jul. 5, 2022, the disclosures of which are incorporated herein by reference in their entireties.

BACKGROUND

This disclosure relates generally to the negotiation of customized documents, and more specifically to an online document system and interface to facilitate multi-party negotiations of document contents.

Reaching agreement on a contract, sale terms, or other document agreed on between two or more entities (such as companies, individuals, groups, or the like) can involve prolonged negotiations over the exact terms of the contract or other contents of the document. A negotiation between two entities can be an extended process involving multiple rounds of edits and versions from all sides. Existing systems for managing negotiation documents often rely on users uploading and reuploading various proposed versions of the negotiated document to a central repository (which can then be downloaded by the other side and changed/critiqued). Generally, these systems make use of existing document editing software and require a user to be familiar with not only the document editing software itself, but with the specific procedures needed to upload the proposed versions of the documents to the system for viewing by the other party in the negotiation. For example, a user may have to take specific steps to download the current version of the negotiated document, identify the changes from the previous version that was last proposed, and then prepare a new version to upload to the central repository.

However, the manual upload and editing process used by many existing systems (having individual users download and independently work on the documents) can leave open multiple avenues for user mistakes that can interrupt the negotiation process. For example, a user can upload the wrong documents (for example an internal version or previous version of the document), a user can become confused with the system when uploading and downloading document versions (as much of the activity happens in the document editing software outside of the system itself), or other similar problems can occur which can cause delays and unnecessary confusion in the negotiation process.

SUMMARY

An online document system can allow users to participate in collaborative negotiation of documents stored with in the online document system. To facilitate negotiations between multiple entities (each potentially including multiple users with different roles in the negotiation), the online document system includes a permissions system that allows per-clause control over user's access to propose and approve changes to a negotiated document. Similarly, the user interfaces for viewing a negotiated document provided by the online document system to users can vary depending on the role of that user in editing the document and the current stage of the negotiation of the document. In addition, the online document system can track agreement between sides in a negotiation on a per-clause basis for display to each entity involved and can otherwise help facilitate the negotiation of the document.

BRIEF DESCRIPTION OF THE DRAWINGS

FIG. 3 illustrates an example user interface for editing documents including clauses with varying clause permissions, according to one embodiment.

FIG. 6 illustrates an example user interface for viewing a negotiation history of a document including both negotiated and unnegotiated clauses, according to one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

An online document system can facilitate the creation, negotiation, and management of documents by one or more users of the online document system. For example, the online documents system can allow users to create, edit, review, and negotiate document clauses with other users.

In some implementations, documents created using the online document system are split into clauses or sections which can be independently modified or negotiated by users of the online document system. An online document system can include a version management system to maintain a record of previous versions and edits to stored documents (or document clauses) and a permissions system controlling user access to documents (or document clauses). In some embodiments, the online document system tailors the user interface view of a document based on the viewing user's permissions related to the document and the current state of any negotiations related to the document.

The online document system can manage negotiations of a negotiated document between multiple entities (where each entity can include multiple users with different roles and permissions related to the negotiated document) according to a negotiation workflow. A negotiation workflow can control which users can make edits to the document and may define actions which require further approval (either by another entity in the negotiation or by a trusted user) to be incorporated into the final negotiated document. In some implementations, the online document system allows entities to agree on documents (or individual clauses) as intermediate steps in a negotiation and can provide information on the current state of a negotiation to relevant users (such as version histories of negotiated clauses). As used herein, an "entity" is a business, group, or individual represented by an associated group of users in the negotiation of a document managed by the online document system. In some embodiments, the online document system can facilitate negotiations between multiple entities on the contents of a negotiated document. Negotiating entities can be unrelated (such as in a negotiation between a first time customer and a company selling a desired service), may have an existing relationship, can be part of a larger group or organization (for example, in a negotiation between two teams of a larger organization), or may share any other relationship outside of the online document system.

Online Document System Architecture

Figure 1:
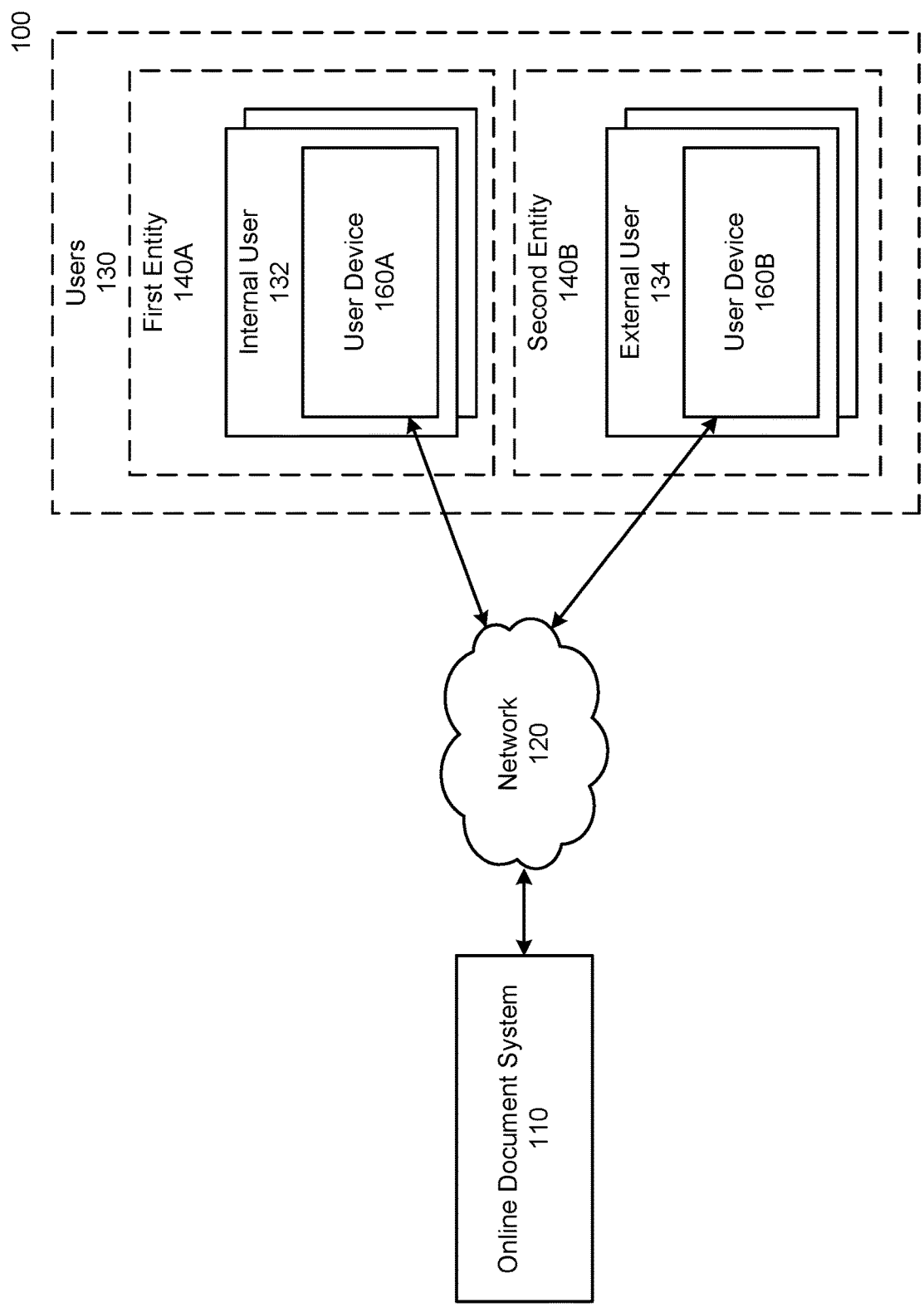
FIG. 1 is a block diagram of a system environment in which an online document system operates, according to one embodiment.

FIG. 1 is a block diagram of a system environment in which an online document system operates, according to one embodiment. The system environment 100 shown by FIG. 1 comprises an online document system 110, a network 120, a set of users 130 which includes a subset of internal users 132 associated with a first entity 140A and a subset of external users 134 associated with a second entity 150B, each associated with a user device 160. In alternative configurations, different and/or additional components may be included in the system environment 100.

The online document system 110 is a computer system (or group of computer systems) for storing and managing documents for a set of users 130. Using the online document system 110, users 130 can collaborate to create, edit, review, and negotiate documents. For example, the online document system 110 can enable the creation of a contract, agreement, press release, or other document arising from a formal negotiation or collaboration between two or more entities 140, as described above. In some implementations, the ODS 110 allows negotiation on a per-clause basis, tracking proposed versions of individual clauses which can be separately (provisionally) agreed on before the document as a whole is agreed on by representative users 130 from both entities 140. The ODS 110 can be a server, server group or cluster (including remote servers), or another suitable computing device or system of devices. In some implementations, the ODS 110 can communicate with user devices 160 over the network 120 to receive instructions and send documents (or other information) for viewing on user devices 160. The ODS 110 can assign varying permissions to individual users 130, groups of users 130, or entities 140 which can control which documents a user 130 can interact with and what level of control the user 130 has over the documents they have access to. The ODS 110 will be discussed in further detail with respect to FIG. 2.

The network 120 may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, 3G, 4G, code division multiple access (CDMA), digital subscriber line (DSL), and the like. Data exchanged over the network 120 may be represented using any suitable format, such as hypertext markup language (HTML) or extensible markup language (XML). In some embodiments, all or some of the communication links of the network 120 may be encrypted using any suitable technique or techniques.

Through the network 120, the online document system 110 can communicate with user devices 160 associated with users 130. A user 130 can represent an individual, automated system, or group, able to interact with documents (or other content) generated on and/or managed by the online document system 110. Each user 130 can be associated with a username, email address, or other identifier that can be used by the ODS 110 identify the user 130 and to control the ability of the user 130 to view and modify documents managed by the ODS 110. In some implementations, users 130 can interact with the ODS 110 through a user account with the ODS 110 and one or more user devices 160 accessible to that user 130. In the embodiment of FIG. 1, the set of users 130 are split into users associated with the first entity 140A and users associated with the second entity 140B. In some implementations, the set of users 130 can also include AI, bots, scripts, or other automated processes set up by an entity 140 to interact with the ODS 110 in some way.

As described above, an entity 140 is a business, group, individual, or the like that is associated with a set of users 130 and one or more documents in the ODS 110. For example, an entity 140 can be associated with an organization having an account with the ODS 110. A document can be associated with more than one entity 140 and can be edited, modified, and approved by users 130 associated with each entity 140. For example, documents negotiated between can be edited, modified, and approved by users 130 from each negotiating entity 140 during the course of the negotiation. According to some embodiments, each entity can be associated with permissions definitions defining actions users 130 can take within the ODS 110, documents the entity has created, imported, modified, or participated in negotiations (or other collaborations on), and/or templates, and workflows to aid in creating documents and managing negotiations with other entities 140. In some embodiments, the set of users 130 associated with an entity 140 can interact documents associated with the entity 140, assign permissions to other users 130 associated with the entity, and modify the entity's templates or workflows.

In the embodiment of FIG. 1, the first entity 140A originally created the document and invited the second entity 140B to negotiate via the ODS 110. In this example, the first entity 140A includes a set of internal users 132 which, as used herein, are users 130 who have a full-fledged user account with the ODS 110 or are otherwise previously known to the ODS 110. The second entity 140B includes a set of external users 134 which, as used herein, are users 130 who have been provisionally invited to participate in the negotiation (and may create temporary or limited accounts to do so). In some implementations, the ODS 110 provides external users 134 limited functionality relative to internal users 132. For example, the editing user interface presented to external users 134 may be simplified and some functionality of the ODS 110 may not be accessible to external users 134.

Entities 140 can be associated with a set of users 130 including only internal users 132 (such as the first entity 140A), including a mix of internal and external users 132 and 134 (for example, an entity 140 who has hired outside consultant external users 134 to participate in a negotiation), or made up of only external users 134 (for example, if an entity 140 opens a negotiation with another entity 140 that did not previously use the ODS 110).

For example, the set of internal users 132 can include users 130 associated with a first entity 140A using the ODS 110 to draft a contract which is to be reviewed and agreed on by a second entity 140B (whose representatives make up the set of external users 150). In other implementations, users 130 may be distinguished individually (for example, based on individual-level permissions of the ODS 110) or be split into more or different groups (such as in the case of a three-entity negotiation). In some implementations external users 134 can be invited (or otherwise identified) by an internal user 132, including an associated with another entity 140.

The user device 160 associated with a user 130 is a computing device capable of receiving user input (for example from a user 130) as well as transmitting and/or receiving data to the ODS 110 via the network 120. For example, a user device 160 can be a desktop or a laptop computer, a smartphone, tablet, or another suitable device. User devices 160 are configured to communicate via the network 120 (for example, with the ODS 110). In one embodiment, a user device 160 executes an application allowing a user 130 of the user device 160 to interact with the ODS 110. For example, a user device 160 can execute a browser application to enable interaction between the user device 160 and the ODS 110 via the network 120. A single user 130 can be associated with multiple user devices 160, in some embodiments. Similarly, one user device 160 can be shared between multiple users 130 who may, for example, log into a personal account on the user device 160 to access the online document system 110, according to some embodiments.

Figure 2:
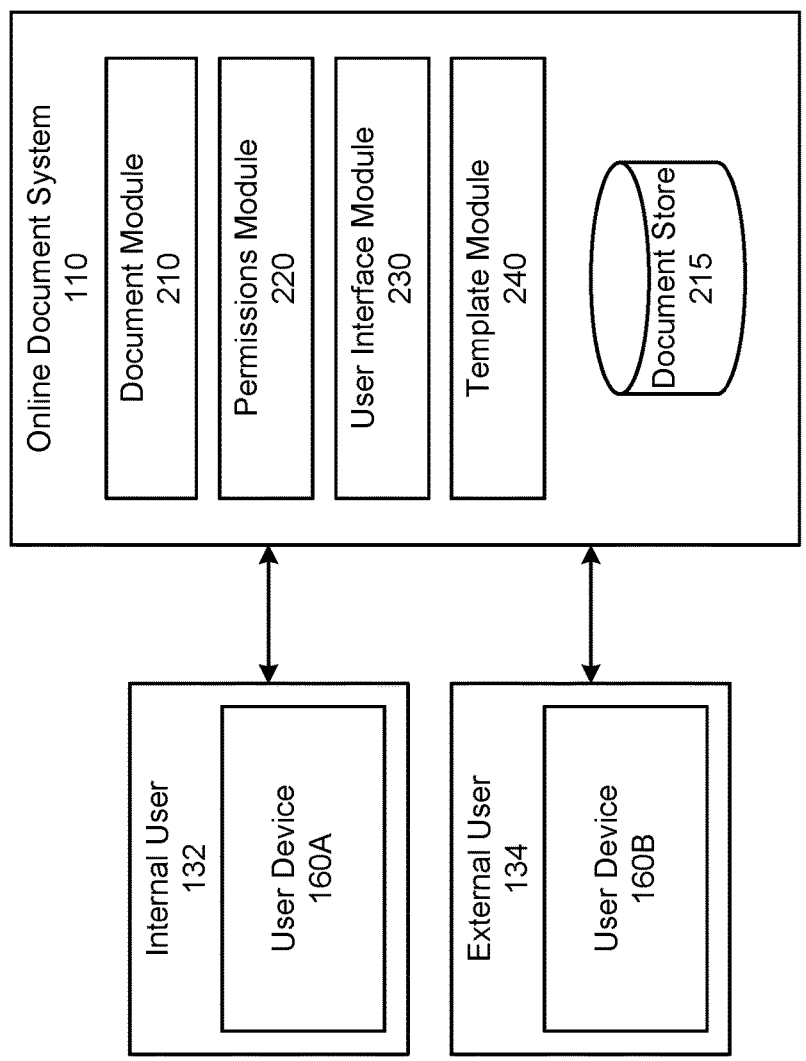
FIG. 2 is a block diagram of an online document system, according to one embodiment.

FIG. 2 is a block diagram of an online document system, according to one embodiment. The environment 200 of FIG. 2 shows the ODS 110 including a document module 210, a document store 215, a permissions module 220, a user interface (UI) module 230, and a template module 240. The environment 200 additionally shows an internal user 132 with a corresponding user device 160A and an external user 134 with a corresponding user device 160B. Conventional components such as network interfaces, security functions, load balancers, failover servers, management and network operations consoles, and the like are not shown so as to not obscure the details of the system architecture.

The document module 210 can generate new documents, manage and update documents stored by the ODS 110, and maintain a record of edits (or other updates) to documents within the ODS 110. In some implementations, the document store 215 stores the documents, document versions, and other metadata related to the stored documents managed by the document module 210. Similarly, the document module 210 interacts with the UI module 230, allowing users to provide new documents or modifications to existing documents and to view existing documents (including past versions of document and metadata about document), according to some embodiments. In some implementations, documents in the ODS 110 are divided into multiple clauses, each semi-independent of the other clauses in the document.

As used herein, a "clause" refers to a defined subset of a document (such as a section, paragraph, or contract clause) which can be independently managed by the document module 210. In some implementations, the document module 210 maintains an independent version history for each clause of the document in place of (or in addition to) an overall version history for the whole document. A document can be split into clauses at the time the document is created in or imported into the ODS 110. In some implementations, each clause is associated with a label or identifier and includes content for the clause (such as text, images, formatting, and the like), a position within the content of the document (used, for example, to display the clause in the correct position within the document and for generating a final document), a version history recording changes to the clause, a clause state (such as "agreed" or "unnegotiated"), a clause type, and/or a set of user permissions for the clause.

In some embodiments, clauses of a document can be assigned one or more clause types used to categorizing the clause within a document and between documents managed by the ODS 110. Clause types can broadly categorize clauses, allowing the ODS 110 to assign similar clauses of the same clause type the same rules (such as negotiation workflows and user permissions) without a user having to repetitively assign or update permissions, negotiation workflows, or other details. In some implementations, the ODS 110 can include clause types representing an area of relevance, such as legal, administrative, or finance clause types, can represent individual product or services (for example a series of clause types covering specific families of products or services associated with an entity 140), or can represent other information about the clause, such as a level of secrecy of the contained information (for example a "sensitive information" clause type). Clause types can also be used to represent a specific format or purpose of a clause, for example a "legal jurisdiction" clause type indicating a clause outlining what country or state laws a contract or agreement is being made under, or a "service description" clause type indicating a clause describing services to be provided or bought. In some embodiments, the ODS 110 uses logic rules based on clause types to assign viewing and editing permissions for clauses associated with one or more clause types.

In some embodiments, clauses are also associated with a "clause state" which, like a clause type, is an attribute of a clause. A clause state, as used herein, can represent the current state of the negotiations between entities 140 on that clause, for example, if the terms of the clause have been decided and agreed, if negotiation is in process on the clause (with not all parties satisfied), or if negotiation has not yet begun on a clause. In some embodiments, the ODS 110 determines clause state for a clause based on one or more clause types assigned by entities 140 and/or other attributes of the clause. For example, users 130 associated with an entity 140 can sign off on a clause by assigning the clause an "accepted" clause type (specific to that entity 140) to clauses the entity 140 is satisfied with. If all entities 140 associated with a document are satisfied with a certain clause, the ODS 110 can calculate the clause state for that clause as "agreed." Similarly, if not all entities 140 are satisfied with the clause, the ODS 110 can assign a "not agreed" clause state. In some implementations, the ODS 110 can assign clause states based on other factors, for example the version history of a clause. A clause without all entities satisfied and no history of edits (determine through the version history) can be assigned an "unnegotiated" clause state indicating that the entities 140 have not begun negotiations on the clause. Similarly, a clause that all entities 140 accept and that has no history of edits can be assigned a "negotiation unneeded" clause state.

In other embodiments, additional clause states can be determined based on additional clause types such as a "near agreed" clause type or other factors of the clause such as the length of time elapsed from the last edit to the clause.

As described above, the document module 210 can maintain a version history recording changes made to each clause of the negotiated document. For example, the document module 210 can store a version history of changes to a clause with the current version of that clause. A version history can include a record of previous changes to the clause (as well as previous versions of the clause), a time and/or date when each change was made, and an identifier of the user 130 made each change. In some implementations, the version history stores proposed changes that have not yet been finalized, as well as an identifier of a user (or group of users) required to approve the change before it is incorporated into the current version of the clause. Similarly, the document module 210 can maintain internal versions of a clause for each entity 140 as well as an "official" version representing the current state of the negotiation visible to all entities 140. When changes are made to an internal (entity-specific) version of a clause the official version is not changed, allowing entities 140 to internally refine the document or clause without exposing working versions to other entities 140.

In some implementations, each entity 140 participating in a negotiation can make changes to an entity-specific version of a document or clause based on permissions granted to users 130 associated with that entity 140. At some point, the entity can propose changes to the official version of the document or clause (for example, based on their changes to the internal version) which are then visible to other entities in the negotiation 140. In some implementations, proposed changes to an official version are not saved until accepted by one or more other entities 140 than the entity 140 proposing the changes.

The method of dividing a document into clauses can depend on the structure and purpose of the document, for example a contract document can be split into clauses representing individual clauses or terms of the contract, while a joint press release might be split into clauses each covering different headings or topics covered in the document. In some implementations, clauses are contiguous portions of a document (for example, a paragraph or paragraphs, connected sentences, pages, or the like), although other implementations may also have non-contiguous clauses. For example, a contiguous clause may cover a "support level" term in a contract which outlines how much continuing support the seller of a product will provide with the product, while a similar non-contiguous clause may cover several "support level" terms for multiple products offered in the same contract.

The document store 215 is a file storage system, database, set of databases, or other data storage system storing documents, document clauses, version histories, and other information about documents managed by the ODS 110. The document store 215 can be a database implemented on a computing system local to the ODS 110, can be a remote or cloud-based database, or can be implemented using any other suitable hardware.

The permission module 220 can manage and enforce user permissions for documents and clauses within the ODS 110. As described above, entities, documents, and clauses within documents can be associated with permissions controlling which actions users 130 can take within the ODS 110. In some implementations, permissions managed by the permissions module 220 explicitly reference a specific user 130 (for example, by name or user identifier), but permissions can also be assigned to users 130 based on membership in an entity 140, group, or subgroup of users 130 or based on a characteristic of the user 130. For example, users 130 can be assigned additional permissions based on an associated with an entity 140 or based on membership in a subgroup of users 130 (such as a legal team of the first entity 140A, or by being an internal user 132).

The permission module 220 can store permissions in a set of "permission definitions" storing permissions for a user 130 (or group of users). In some implementations, each permission definition stores a description of one or more permissions (for example, editing or viewing permissions), an indication of one or more entities 140, documents, or clauses the permission definition applies to, and identification of the set of users 130 the permission definition applies to. For example, a permission definition can grant permissions to a user 130 based on an individual identifier of the user 130, based on association with an entity 140, based on the user's membership in a subgroup or association with a role or title, or based on another characteristic of the user 130. Similarly, a permission definition can define the documents and/or clauses the permission definition applies to based on a direct identifier of an entity 140, document, or clause, or based on a logic rule defining documents and/or clauses the permission definition grants permissions to. For example, a permission definition can specify a combination of one or more specific clause types (such as "legal" or "confidential"), document types (such as "sales contract"), and/or user characteristics defining situations to which the permission definition applies. In some implementations, a permission definition can reference other characteristics of a clause, such as the content of a clause or a difference between an original and modified version of a clause. For example, a permission definition can include logic rules detecting clauses with content including a threshold dollar amount or a change in a threshold dollar amount and assigning permissions to require approval of such changes (such as requiring approval from a finance team when changing the prices in a sales contract).

In some embodiments, permission definitions can interact with and override other permission definitions based on a hierarchy or other ranking system. In some implementations, more specific permissions can override general "default" permissions. For example, an entity-wide permission definition can be overwritten by a document-level permission definition and a permission definition for a group of users 130 can be overruled by a permission definition naming an individual user 130. In some implementations, permissions are initially assigned at the time a document is created and can later be further modified by the document creator/owner (or another authorized user). For example, documents can be generated based on a template or other pre-defined shell which may include default permission definitions granting permissions to appropriate users 130 when a document is created using the template.

The permission module 220 can assign permissions to view, edit, approve edits to, or otherwise modify a clause or document. In some implementations, editing permissions include "full edit" permissions granting a user 130 the ability to make and save changes to the content of the clause, "approved edit" permissions allowing a user 130 to make edits which are not incorporated into the clause until another user 130 approves the proposed changes (for example, a user with "approval" permissions for the edited clause), and a "pre-approved edit" permission which allows a user to switch a clause between prewritten stock forms of a clause (for example, choosing from a selection or menu of pre-approved options for the clause). Similarly, the permission module 220 can assign other permissions, such as a "view only" permission (which allows a user 130 to view but not edit the clause) or a "locked" permission (which prevents a user 130 from editing the clause).

In some implementations, the permissions module 220 also includes permissions which allow users 130 to modify the permissions granted to other users. For example, administrator permissions or "locking" permissions allowing a user 130 to prevent other users 130 from editing the clause (by assigning them the "locked permission, in some embodiments). Similarly, permission definitions can grant users permissions to manage a negotiation between entities, such as permissions to officially proposing a change to a document or clause (resulting in the changes being visible to other entities), permissions to view proposed changes, and permissions to accept proposed changes. Similarly, the permissions module 220 can grant permissions allowing a user 140 to change the clause state of a clause to represent the state of negotiation on behalf of an entity 140. For example, a user can change a clause state to "approved" to indicate that the entity 140 approves of a clause in its current state. Other implementations of the permissions module 220 can include more or different permissions assignable to users 130.

As described above, the permissions module 220 can manage permissions for users 130 interacting with documents of the ODS 110. In some embodiments, permissions are separately assigned and managed for each entity 140 in the negotiation (for example users 130 associated with the first entity 140A cannot control the permissions of the user associated with the second entity 140B). The permissions module 220 can, in some implementations, automatically suggest a permission definition for a clause including one or more permissions based on a clause type of the clause, based on one or more known users 130 participating in the negotiation process, or based on other similar characteristics of the clause or document. In some embodiments, the permissions module 220 can intervene when a user 130 attempts to take an action they don't have permission for, for example by displaying a notification message informing the user 130 of the lack of permission and identifying or notifying another user 130 who does have permission to perform the desired action.

The UI module 230 can generate user interfaces allowing users 130 to interact with documents managed by the ODS 110, according to some embodiments. For example, the UI module 230 can receive user instructions from a web-based application with integrated document content editing interacted with by a user 130. In some implementations, the UI module 230 can provide a user interface enabling users 130 to add, delete, or modify the contents of a negotiated document or documents clause based on one or more permission definitions. A UI provided by the UI module 230 can allow users to modify content such as text, images, links to outside sources of information such as databases, and the like. Similarly, the UI module 230 can provide a UI for authorized users 130 to view or modify permissions definitions granting permissions to other users 130. In some implementations, the UI module 230 provides tools for participating in a negotiation between entities 140, for example, by allowing authorized users 130 to change permissions of other users 130, view version histories of clauses, change or advance a negotiation workflow, invite external users 134 to participate in the negotiation, agree on or finalize clauses, or view a visualization of the current state of the negotiation (for example, a visualization of agreed on clauses and/or the changes to a negotiated document). As described above, the UI module 230 can display different versions of a negotiated document or clause to different users 130 (based on an associated entity 140, a permission definition, or another suitable factor), such as by displaying a simplified UI to external users 134. The user interface module 230 and example user interfaces will be discussed further below in relation to FIGS. 3-7.

The template module 250 can manage one or more templates for documents, clauses, or other content for an entity 140. Templates managed by the template module 250 can include document content and clauses common to documents generated using the template (for example, formatted document text, images, or embedded video or clauses containing the same), template permission definitions for assigning permissions to documents created using the template, and/or workflows, logic, or other rules controlling documents created with the template.

For example, a template for a document can include document clauses and content for a common type of document used by an entity 140, such as a contract, agreement, periodic report, or the like. For example, a template sales contract can include pre-generated boilerplate and pre-written clauses for common services offered to clients. Templates can include blank fields which can be filled in by a user 130 when creating a document based on the template. In some implementations, templates include "merge fields" which can automatically pull in data from an outside database or data source (such as a date, customer information, or the like). In some implementations, templates include template logic controlling whether a certain document clauses and/or fields will appear in a given document generated with the automatic template. The template logic can comprise one or more "logic conditions" which, if satisfied, affect the inclusion of an associated conditional document clause in the generated document. A conditional document clause can include conditional document text and/or merge fields which will be included in a generated document if the associated logic condition is satisfied. For example, an automatic template can be used to generate a contract for a service agreement, with merge fields related to the known information about the client and the service purchase, and with template logic to include different clauses depending on the specific service being purchased.

In some implementations, a template or document can include multiple template versions of the same clause. For example, each version of a clause can include pre-approved content covering a different situation (such as with a legal clause in a contract that has been approved by legal counsel). In some embodiments, users 130 can select between template clauses during document creation or as part of editing the document (for example, based on a pre-approved edit permission as described above).

In same implementations, templates can include pre-assigned default permissions naming specific users 130 (or groups of users). For example, a template for a sales contract may include a default permission definition granting editing permissions to members of the sales team (one or more internal users 132) who typically negotiate such contracts. Similarly, a template can include one or more permission roles associated with permission definitions (but not naming an applicable user 130), for example, roles for a supervisor who approves changes, and one or more lower level client contacts/engineers who may actively communicate with another entity 140 in the negotiation. In some implementations, the permission roles can be assigned to users 130 (or groups of users 130) at the time the document is created. For example, the template for the sales contract could include predefined permission definitions for the roles of "supervisor," "legal expert," and "product expert" which can be assigned to appropriate users 130 when a document is created from the template.

Example Document Editing Interfaces

As described above, the UI module 230 can present a UI to users 130 allowing the users 130 to interact with the ODS 110 (for example, to create, view, negotiate, and/or modify documents). FIG. 3 illustrates an example user interface for editing documents including clauses with varying clause permissions, according to one embodiment. The document editing interface 300 illustrated in FIG. 3 includes a document viewing area 310 including document contents such as clauses 320A and 320B each associated with corresponding permission definitions 330A and 330B for a set of users 130 including internal users 340A and 340B and external user 350A. In alternative configurations, different and/or additional user interface elements may be included in the document editing interface 300.

In the embodiment of FIG. 3, the document viewing area 310, according to some embodiments, allows a user to enter, edit, and delete document content. In some implementations, the document editing area 420 provides text editing and/or formatting features for entering and manipulating document content (for example, font size, line spacing, and the like) or features for modifying the arrangement of clauses 320 (for example, to add, remove, rearrange, or otherwise modify clauses 320). Similarly, the document editing interface 300 can include additional UI elements enabling authorized users 130 to modify the permissions of a document, such as by adding, removing, or modifying the permission definitions associated with a document or clause. As described above, changes can be made to an internal version of a document or clause specific to one entity 140 or to an official version of a document visible to all participating entities 140.

In the embodiment of FIG. 3, the document viewing area 310 displays a document containing several clauses 320 (represented in FIG. 3 by clause 320A and clause 320B), each containing different content and associated with an individual permission definition 330. Here, clause 320A is associated with the permission definition 330A which grants full editing permissions to internal users 340A and 340B and locked permissions for external user 350A (which prevents external user 350A from editing clause 320A). In contrast, clause 320B is associated with different content and a separate the permission definition 330A which grants full editing permissions to internal user 340A, but only approved edit permissions to internal user 340B. As described above, users 130 (including internal users 340 and external users 350) can interact with the document editing interface 300 according to permissions granted in one or more permission definitions 330.

Figure 4:
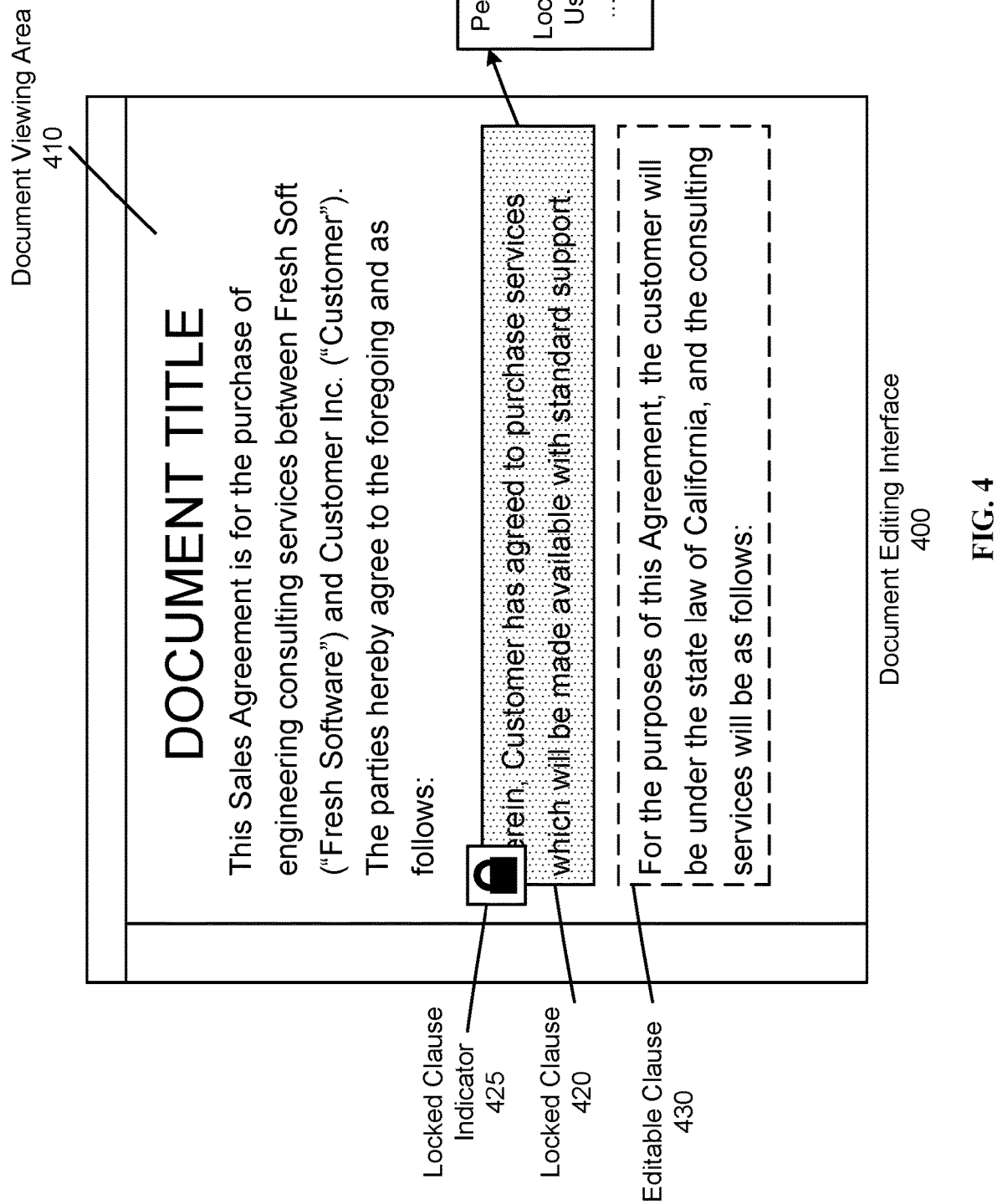
FIG. 4 illustrates an example user interface for viewing and editing documents including locked clauses, according to one embodiment.

FIG. 4 illustrates an example user interface for viewing and editing documents including locked clauses, according to one embodiment. FIG. 4 illustrates an alternative view of a document editing interface, for example, from the perspective of a user 405 during a negotiation. The document editing interface 400 includes a document viewing area 410 including a locked clause 420 and an editable clause 430. The locked clause 420 is displayed with a locked clause indicator 425 based on a permission definition 427. In alternative configurations, different and/or additional user interface elements may be included in the document editing interface 400.

When viewing a document through the document viewing area 410 of the document editing interface 400 a user 130 may see locked clauses 420 the user 130 is unable to modify. The locked clause 420 of FIG. 4 includes several visual indications that the user 130 is unable to modify the locked clause 420. For example, the locked clause 420 can be displayed in a different color that editable clauses (such as "greyed-out" text), set against a colored background, surrounded with a distinctive border, or otherwise distinguished from editable clauses 430. In some implementations, a locked clause indicator 425 displayed in the document editing interface 400 overlaid on or proximate to the locked clause 420 to clearly identify the locked clause 420 as locked or otherwise distinguishing the locked clause from editable clauses 430. For example, the locked clause indicator 425 can be an overlaid icon (as shown in FIG. 4), a margin identifier, or a text box or bubble.

The editable clause 430 can similarly be displayed with characteristics distinguishing the editable clauses 430 from other clauses that aren't editable (such as the locked clause 420).

In some implementations, a clause of a document can be displayed as a locked clause 420 as a result of a specific "locked" permission assigned a viewing user 405 in a permission definition 427. For example, the locked clause 420 is locked for the user 405 based on the permission definition 427 and therefore the locked clause indicator 425 (and/or other visual indications) are displayed to the user 405 when viewing the locked clause 425 through the document editing interface 400. In other implementations, any clauses the user 405 can view (but does not have the ability to edit) can be displayed as locked clauses 420. In some implementations, if the user 405 attempts to edit the locked clause 420, the document editing interface 400 can notify the user 405 that they lack the correct permissions, including text within the notification indicating which requirement the user 405 does not satisfy.

Figure 5A:
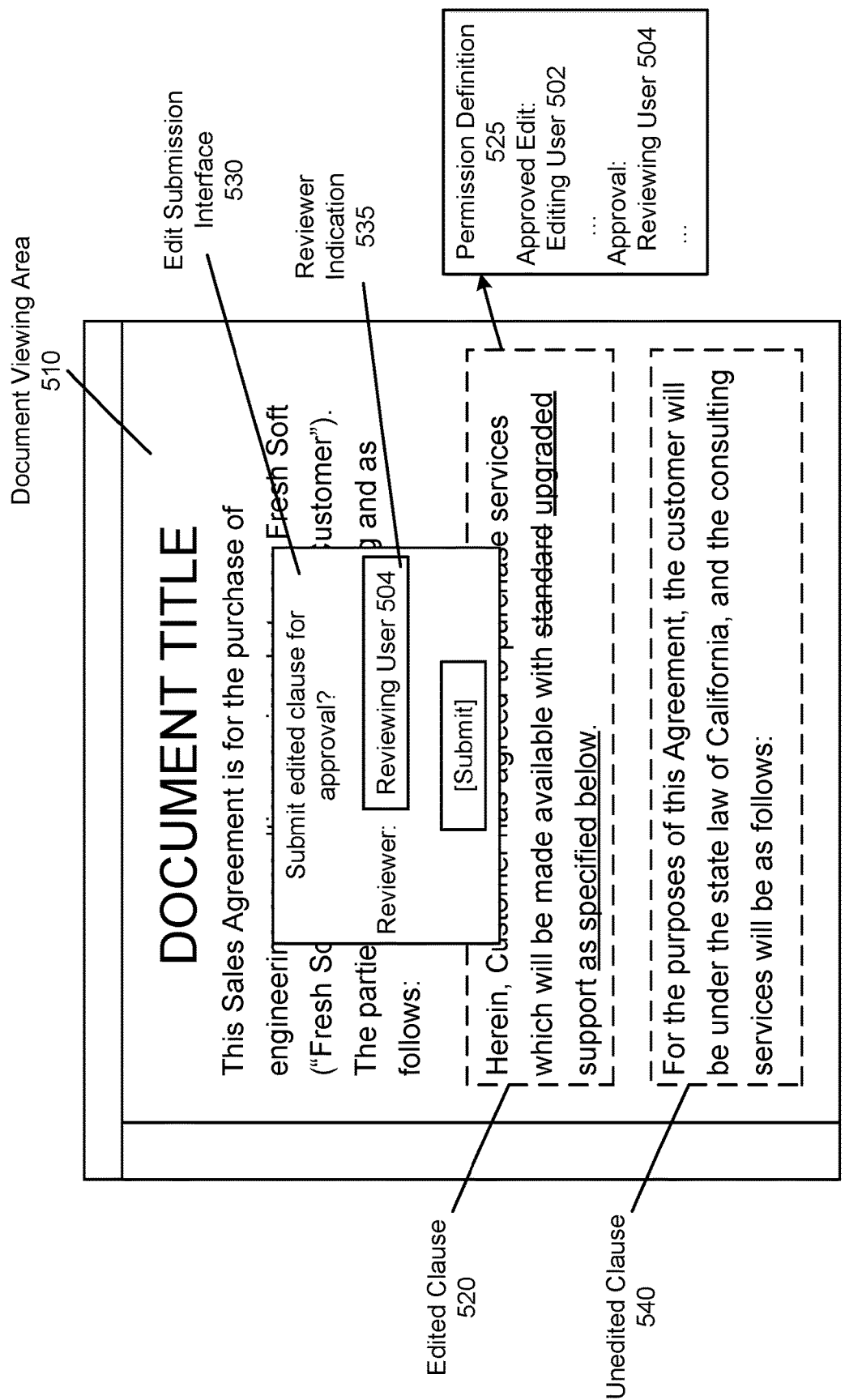
FIG. 5A illustrates an example user interface for submitting edited clauses for approval according to clause permissions, according to one embodiment.

FIG. 5A illustrates an example user interface for submitting edits for approval according to clause permissions, according to one embodiment. FIG. 5A illustrates a document editing interface 500 from the perspective of an editing user 502. The document editing interface 500 includes a document viewing area 510 including an edited clause 520, an edit submission interface 530 with a reviewer indication 535 naming reviewing user 504, and an unedited clause 540. The edited clause 520 is associated with a permission definition 525 granting permissions to the editing user 502 and the reviewing user 504. In alternative configurations, different and/or additional user interface elements may be included in the document editing interface 500.

In the embodiment of FIG. 5A, the editing user 502 has been assigned approved edit permissions for the edited clause 520. As described above, approved edit permissions allow a user 130 (such as the editing user 502) to make modifications to clause content which will be saved but not incorporated until approved by another user 130 with corresponding approval permissions for the clause. In FIG. 5A, the editing user 502 has made changes to the content of edited clause 520. In some embodiments, changes to a clause can be represented by markup, highlighting, or other visual indications of the changes. Because the editing user 502 has approved edit permissions to the edited clause 520, the changes require approval from another user 130. In some implementations, the editing user 502 can manually submit changes for review through an edit submission interface 530. In other embodiments, the ODS 110 automatically detects and submits changes for approval.

The edit submission interface 530 is shown within the document viewing area 510 in response to an action by the editing user 502 (such as the selection of a confirm edits button or input of a keyboard shortcut). The location of the edit submission interface 530 within the document viewing area 510 can be based on the location of the edited clause 520. In some implementations, the edit submission interface 530 includes a reviewer indication 535 notifying the user of the reviewer who will approve the edits made to the edited clause 520 and user interface elements for submitting the changes to be approved. For example, the reviewing user 504 can be the selected reviewer for approving the changes to the edited clause 520. In some implementations, more than one user 130 can be assigned approval permissions for a clause and, depending on the implementation, one or more may need to approve of the changes before they are incorporated into an internal or official version of the document. Unapproved changes can be visible only to the editing user 502 and the reviewing user 504 or can be visible to all users 130 with markup or another visual indication the changes are not approved. In some implementations, the editing user 504 can select users to review the changes through the edit submission interface 530.

For example, the editing user 502 can submit an edited clause to a reviewing user 504 that is associated with the same entity 140 as the editing user 502. Once the edits are approved by the reviewing user 504, the edits can be incorporated into an internal version associated with the entity 140. In some implementations, the edits can be further submitted for review by an additional reviewing user associated with a different entity 140 and ultimately incorporated into an official version of the negotiated document.

Figure 5B:
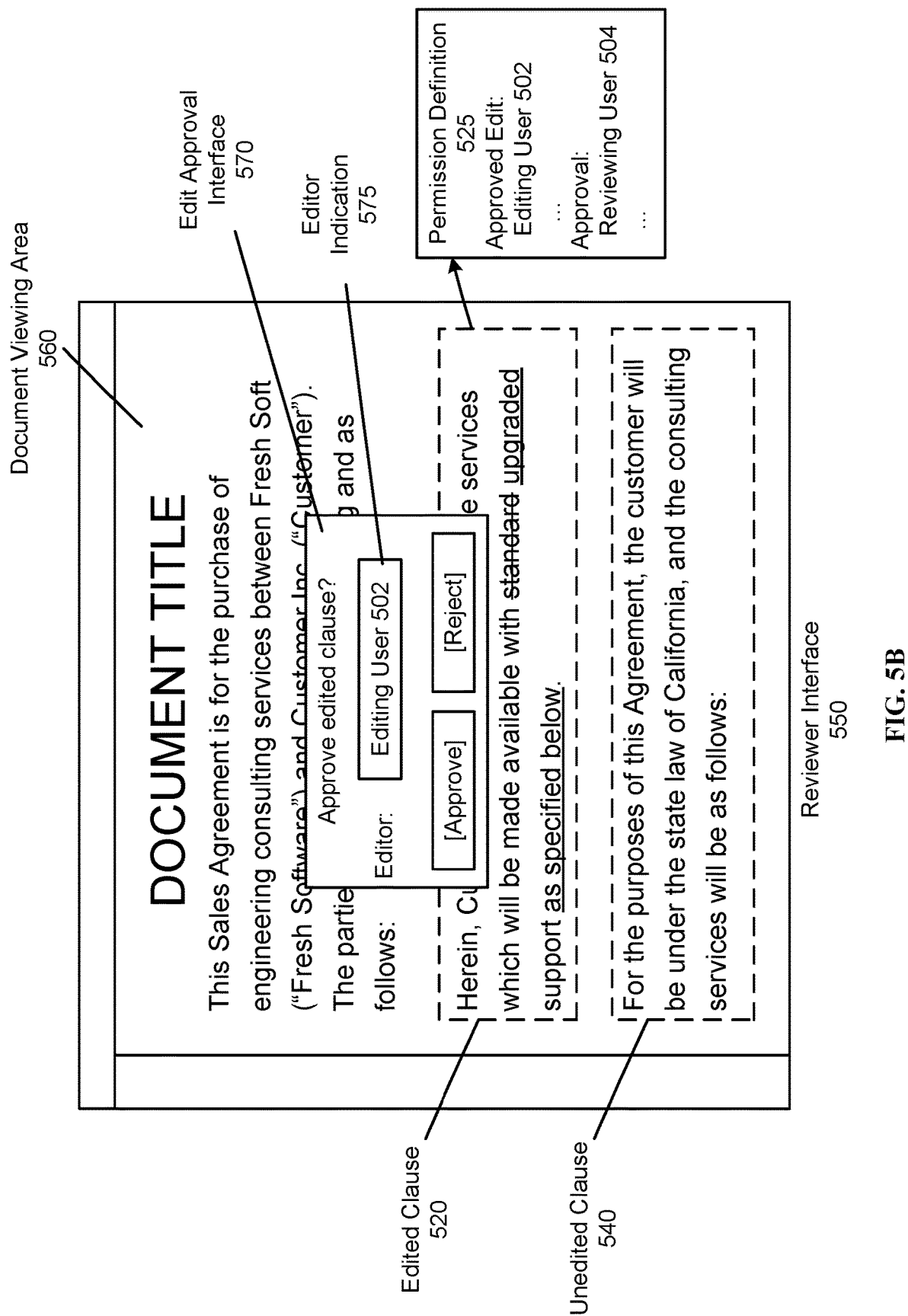
FIG. 5B illustrates an example user interface for viewing and approving edited clauses submitted for approval, according to one embodiment.

FIG. 5B illustrates an example user interface for viewing and approving edited clauses submitted for approval, according to one embodiment. FIG. 5B illustrates an edit approval interface 550 from the perspective of a reviewing user 504. The reviewer interface 550 includes a document viewing area 560 including an edited clause 520, an edit approval interface 570 with an editor indication 535 naming editing user 502, and an unedited clause 540. The edited clause 520 is associated with a permission definition 525 granting permissions to the editing user 502 and the reviewing user 504. In alternative configurations, different and/or additional user interface elements may be included in the edit approval interface 550.

In the embodiment of FIG. 5B, the reviewing user 504 has been assigned approval permissions for the edited clause 520. As described above, approval permissions allow a user 130 (such as the reviewing user 504) to approve modifications or edits made by another user 130 with approved edit permissions for the clause. In FIG. 5B, the editing user's 502 changes to the content of edited clause 520 are displayed to the reviewing user 504 represented by markup, highlighting, or another visual indication. In some embodiments, the edit approval interface 570 also displays further information about the edited clause 520, such as previous version of the edited clause 520 or related clauses in the document. After the reviewing user 504 has reviewed the edits made by the editing user 502, the reviewing user 504 can approve or reject the edits using the edit approval interface 570.

In some implementations, the edit approval interface 570 is displayed within the document viewing area 560 in response to an action by the reviewing user 504 (such as the selection of an approve edits button or input of a keyboard shortcut). The location of the edit approval interface 570 within the document viewing area 510 can be based on the location of the edited clause 520. In some implementations, the edit approval interface 570 includes an editor indication 575 notifying the reviewer of the user 130 who made the edits to the edited clause 520 (for example, the editing user 502). The edit approval interface 570 can include UI elements for approving or rejecting the change to the edited clause 520. In some implementations, the edit approval interface 570 can include a disclaimer or further context for accepting the edited clause 520, such as a list of potential liabilities or implications of the edited clause 520.

Example Document Negotiation Interfaces

In addition to document editing interfaces, the user interface module 230 can also provide users 130 with interfaces designed to aid in the management of a negotiation between entities 140. FIG. 6 illustrates an example user interface for viewing a negotiation history of a document including both negotiated and unnegotiated clauses, according to one embodiment. FIG. 6 illustrates a negotiation status interface 600 displaying a summary of the status of a negotiation. In some implementations, users 130 can access a negotiation status interface 600 to view a summary of the progress of the negotiation between entities 140. The negotiation status interface 600 includes a document viewing area 610 including clauses 620A and 620B each displayed with a clause state indicator 630 based on a clause state of the associated clause. In alternative configurations, different and/or additional user interface elements may be included in the negotiation status interface 600.

As described above, the ODS 110 can determine a clause state summarizing the current state of the negotiation for each clause of a document. In some implementations, a negotiation status interface 600 displays the determined clause states for each clause 620. Each clause state can be associated with a specific visual treatment which can include a text color, background color, and/or border different than other clause states. Similarly, clause states can be associated with a style of clause state indicator 630 displayed in the negotiation status interface 600 overlaid on or proximate to a clause 620 to identify the clause state of the associated clause 620. For example, a clause state indicator 630 can be an overlaid icon, a margin identifier, or a text box or bubble (as shown in FIG. 6).

The clause 620A is associated with an "agreed" clause state, which is reflected by the clause state indicator 630A and, in some implementations, an additional visual effect overlaid around or over the clause 620A, as described above. In the embodiment of FIG. 6, the clause state indicator 630A for an agreed clause is a text box overlaid on the clause 620A containing the text "agreed." Similarly, the clause 620B is associated with an "not agreed" clause state, which can represent a negotiation state where only a subset of entities 140 (or no entities 140) approve of the clause. Similar to the clause 620A, the clause state of clause 620B can be identified using a visual effect overlaid around or over the clause 620B that identifies the "not agreed" clause state. The clause state indicator 630B for a not agreed clause can be overlaid on the clause 620B and identify the clause 620B as not agreed on. In some implementations, the clause state indicator 630B for a not agreed clause can identify the entities 140 (if any) who have approved of the clause (for example, entity 650 as shown in FIG. 6). In some implementations, clause states other than "agreed" and "not agreed," such as "unnegotiated" and "negotiation unneeded" are similarly distinguished in the negotiation status interface 600.

In some embodiments, the negotiation status interface 600 can include additional views or organization methods providing additional insights into the current state of the negotiation. For example, the negotiation status interface 600 can reorganize the clauses 620 of a document based on clause state (for example, by placing agreed on clauses together, unnegotiated clauses together, etc.). Similarly, the negotiation status interface 600 can organize clauses 620 based on the user 130 viewing the negotiation status interface 600, for example, to highlight clauses 620 the viewing user 130 can interact with. In some implementations, the negotiation status interface 600 can minimize or abstract the content of a clause 620 and instead identify each clause 620 by a clause name, identifier, or summary.

According to some embodiments, the negotiation status interface 600 can generate a to-do list like interface for a viewing user 130 which highlights clauses and actions the viewing user 130 can take to advance the negotiation depending on the permissions of the viewing user 130. For example, if the viewing user 130 has edit approval permissions for one or more clauses 620 with pending edits, the negotiation status interface 600 can group those clauses 620 in a prominent part of the interface (such as the top of the list of clauses 620). Similarly, a viewing user 130 authorized to sign off on one or more clauses 620 (for example, through changing the clause type to "accepted") and therefore influence the clause state of those clauses 620 can be presented a negotiation status interface 600 with clauses 620 with not agreed or unnegotiated clause statuses grouped at the top of the list. For a viewing user 130 with only editing permissions, the to-do list can focus on not agreed or unnegotiated clauses 620 the viewing user 130 has permission to edit.

In some implementations, the negotiation status interface 600 includes additional information about each clause 620, such as the amount of time since an edit has been made to the clause 620, a total number of edits made to the clause 620, an identifier of a user 130 who made the most recent edits to the clause 620 or an identifier of users 130 who need to approve edits or sign off on the clause 620. The negotiation status interface 600 can update dynamically or periodically based on changes to the clauses 620. For example, if a clause is signed off on by all entities 140, the clause can be moved from a "not agreed" clause state to an "agreed" clause state and subsequently repositioned within the negotiation status interface 600 to reflect the updated clause state. Clauses 620 can similarly be updated in the negotiation status interface 600 based on approval of pending edits, additional edits being received, or other changes to the clause 620.

Figure 7:
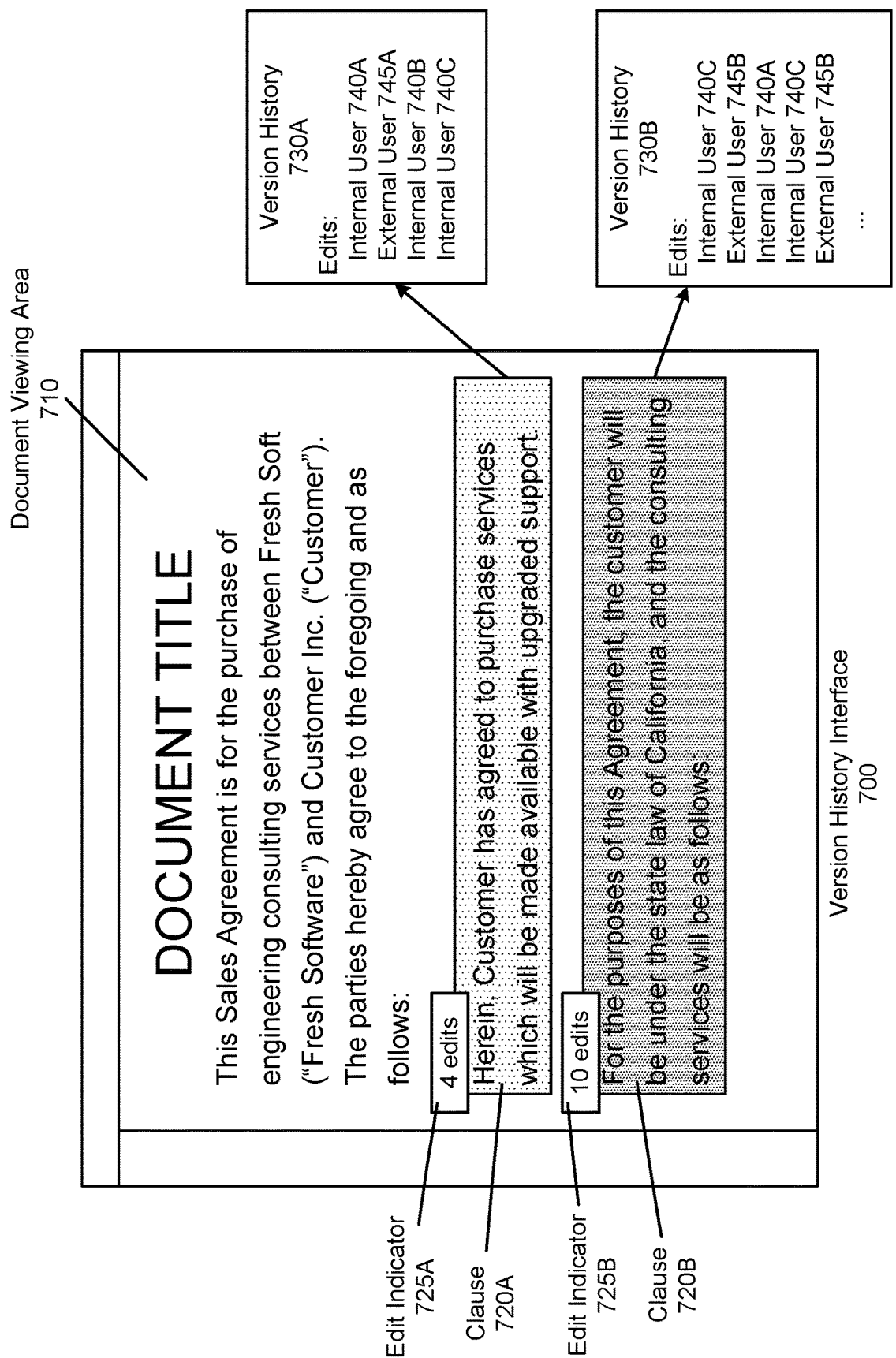
FIG. 7 illustrates an example user interface for viewing a version history of a document displaying a history of edits to clauses within the document, according to one embodiment.

In some implementations, the user interface module 230 provides authorized users 130 with a version history interface allowing a viewing user 130 to see one or more previous versions of clauses and/or statistics about edits to clauses of the documents. FIG. 7 illustrates an example user interface for viewing a version history of a document displaying a history of edits to clauses within the document, according to one embodiment. The version history interface 700 includes a document viewing area 710 including clause 720A and 720B. Each clause is associated with an edit indicator 725 and a version history 730 outlining a set of edits to the clause 720 made by internal users 740 and external users 745.

As described above, the ODS 110 can store a version history of each clause 720 preserving old versions of the clause 720 as well as information about the users 740 and 745 making changes to the clause 720. In some implementations, the version history interface 700 can display a summary of the version history for one or more clauses 720.

Each, clause 720 can be associated with an edit indicator 625 displayed in the version history interface 700 overlaid on or proximate to the clause 720 to provide a summary of the edit history of the associated clause 720. A clause state indicator 630 can be an overlaid icon, a margin identifier, or a text box or bubble (as shown in FIG. 7). In the embodiment of FIG. 7, the edit indicators 725 display the number of edits previously made to the associated clause 720. For example, the clause 720 has been edited four times according to the version history 730A so the edit indicator 725A displays "4 edits." In other embodiments, the edit indicators 725 can display other relevant information from the version history 730 of the corresponding clause 720, such as an identifier of the user 740 or 745 that last edited the corresponding clause 720 or an elapsed time since the last edit to the clause 720.

In some implementations, clauses 720 can be overlaid with a specific visual treatment which can include a text color, background color, and/or border based on the number of edits made to the clause 720 (or other statistic of the clause 720). For example, the version history interface 700 can display a heatmap view of edits, where clauses 720 are displayed in progressively brighter colors as the number of edits to the clause 720 increases. For example, the clause 720B has been edited more times than the clause 720A and can therefore be displayed in a brighter color.

The version history interface 700 can display other relevant information about the version history 730 of clauses 720. For example, the version history interface 700 can allow a user 130 to open the full version history 730 of a clause or view old versions of a clause 720.

Document Negotiation Processes

Figure 8:
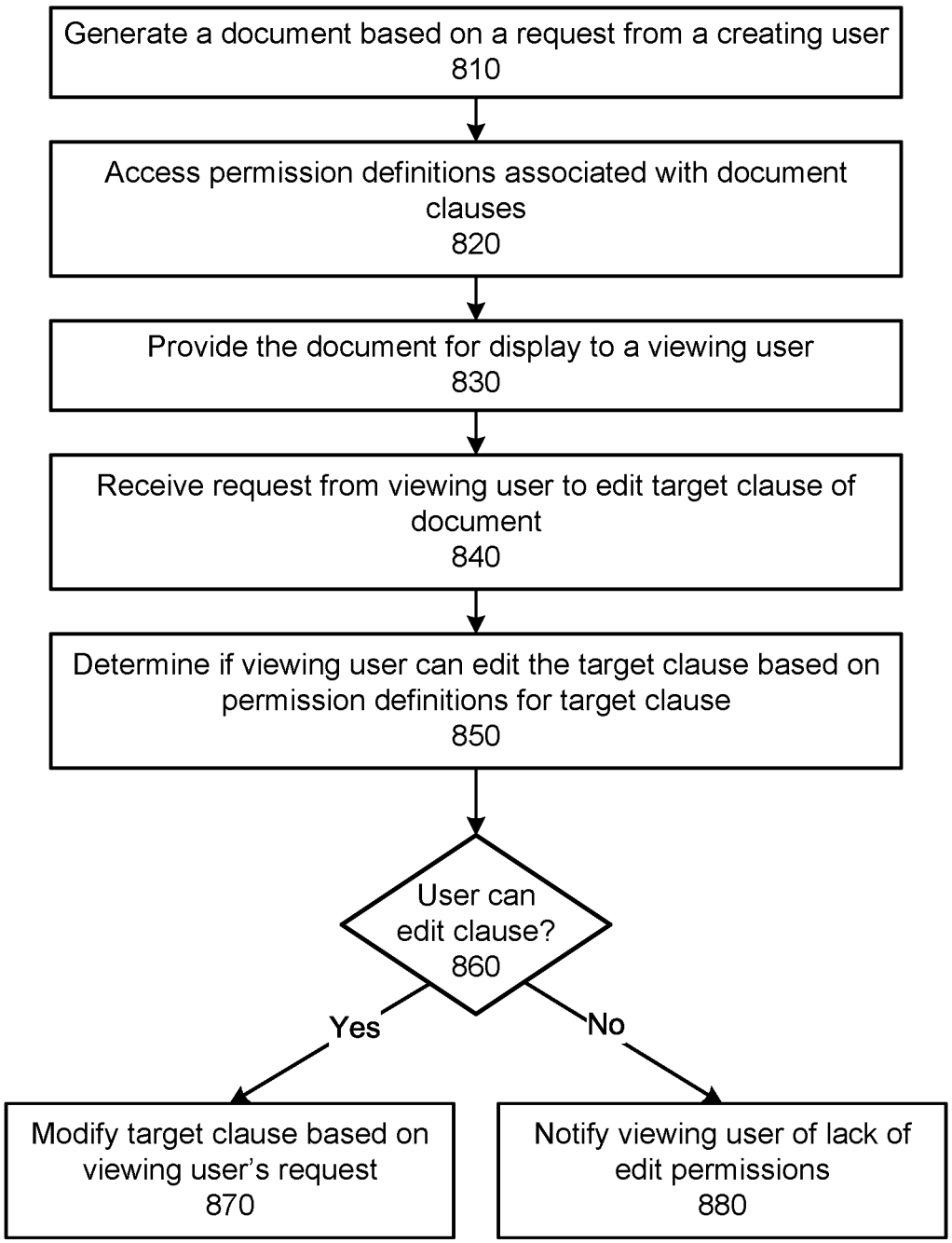
FIG. 8 is a flowchart illustrating a process for generating and editing a document using an online document system, according to one embodiment.

FIG. 8 is a flowchart illustrating a process for generating and editing a document using an online document system, according to one embodiment. The process 800 begins when a document is generated 810 by the ODS 110 based, for example, on a request from a creating user. In some implementations process of creating a document in the ODS includes receiving a document creation request alongside clauses, clause content, and permission definitions for the document. At some point after the document is created, the permissions definitions associated with the document clauses are accessed 820 by the ODS 110, for example, in response to a request by a viewing user to view the document. If the viewing user has permission to view the document, the ODS 110 generates an interface and provides 830 the document for display to the viewing user. The viewing user can the request 840 to make one or more edits or changes to a target clause of the document, for example changing the clause content or permission definitions associated with the clause. Based on the current permission definitions associated with the clause, the ODS 110 can determine 850 if the viewing user can edit the target clause as request. If the viewing user can 860 edit the target clause, the ODS 110 modifies 870 the target clause based on the edits specified in the viewing user's request. Otherwise, the viewing user is notified 880 of the lack of permissions to make the requested edits.

Figure 9:
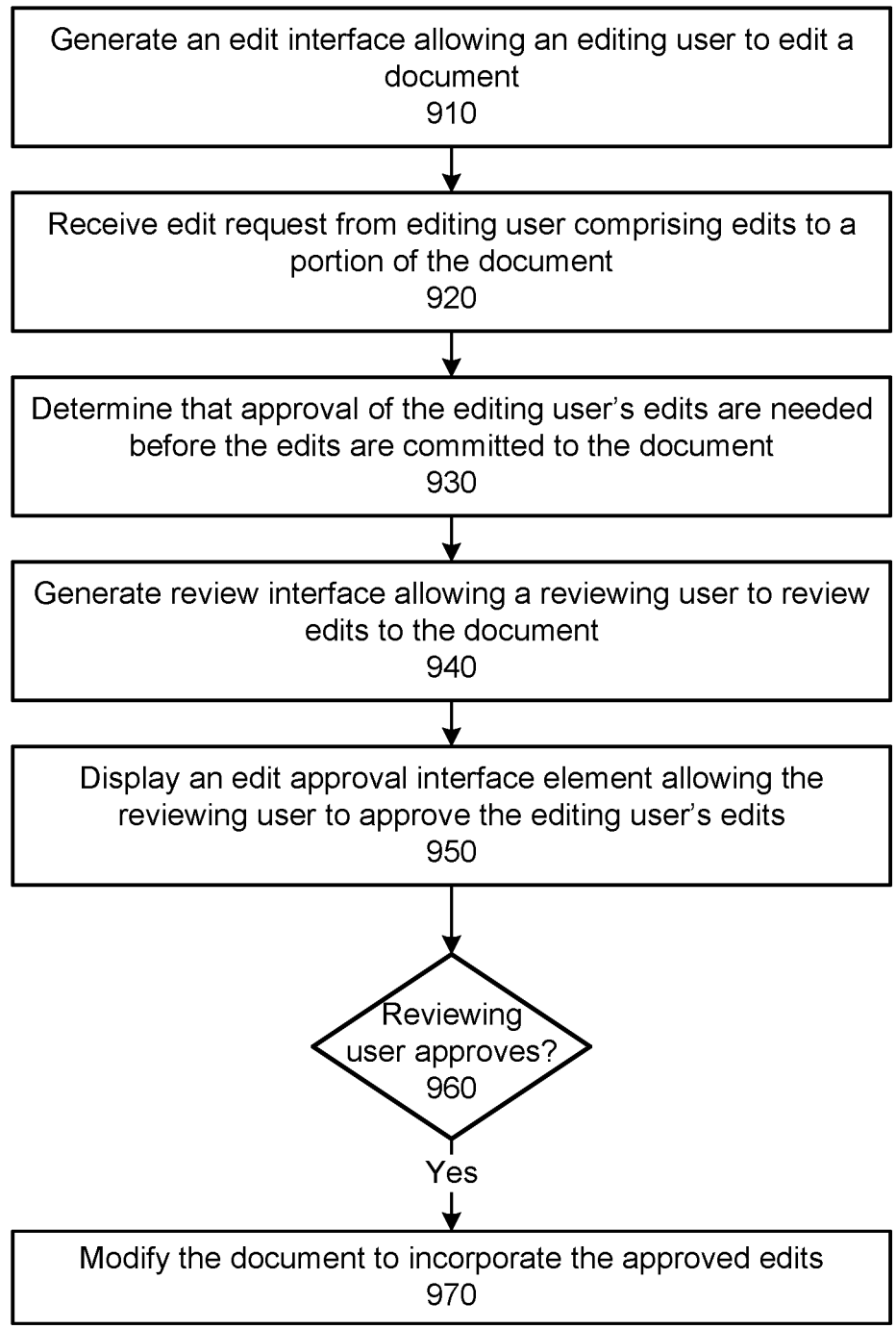
FIG. 9 is a flowchart illustrating a process for managing and approving edits using an online document system, according to one embodiment.

FIG. 9 is a flowchart illustrating a process for managing and approving edits using an online document system, according to one embodiment. The process 900 begins when the ODS 110 generates 910 an edit interface for an editing user to edit a document (or one or more clause of a document). Subsequently, the ODS 110 can receive 920 an edit request from the editing user including one or more edits to a portion of the document (for example, changing the content of a clause of the document). The ODS 110 then determines 930 that approval of the editing user's edits is needed before the edits are committed to the document (for example, based on a request by the editing user or a permissions definition associated with a clause of the document). In response to the need for approval of the edit request, the ODS 110 generates 940 a review interface which can allow a reviewing user (who may have more permissions than the editing user) to review edits to the document. The ODS 110 can display 950 an edit approval interface element allowing the reviewing user to approve or reject the editing user's edits. If the reviewing user approves 960 the edits, the document is modified 970 to incorporate the edits. In some implementations, if the reviewing user rejects the edits the editing user can be notified of the rejection.

Figure 10:
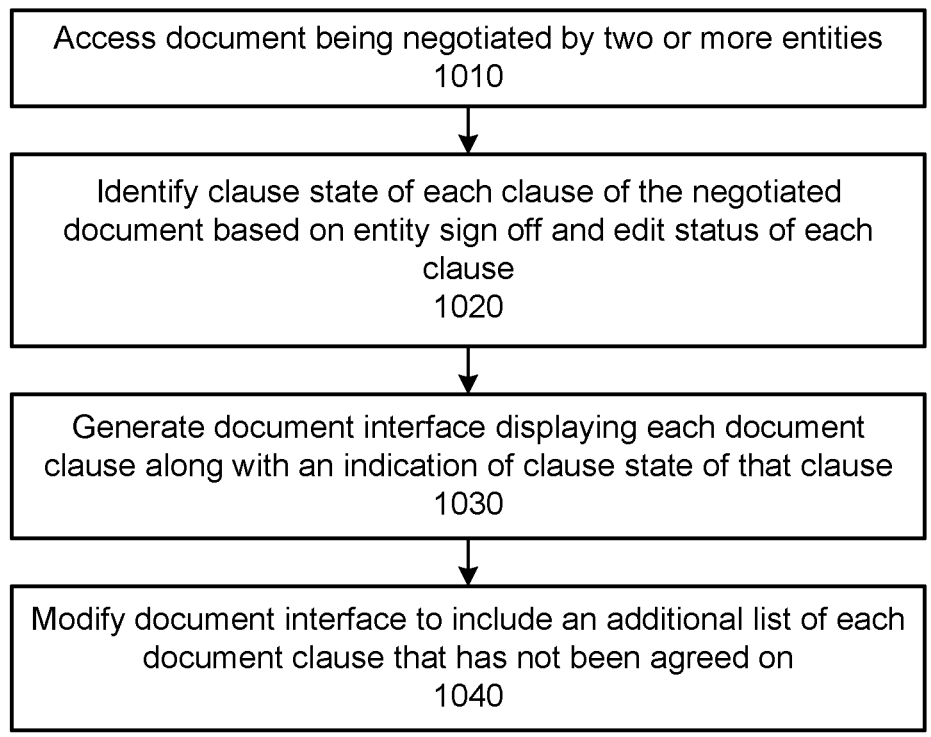
FIG. 10 is a flowchart illustrating a process for viewing the status of a negotiated document using an online document system, according to one embodiment.

FIG. 10 is a flowchart illustrating a process for viewing the status of a negotiated document using an online document system, according to one embodiment. The process 1000 begins when the ODS 110 accesses 1010 a document being negotiated between two or more entities (where each entity can be associated with multiple users). As described above, each clause of the negotiated document can be associated with a version history storing edits to the clause and one or more clause types (which can include sign offs from one or more entities). The ODS 110 can then identify 1020 a clause state of each clause of the negotiated document, where the clause state can represent how close the entities are to agreeing on the clause. The identification of clause state for a clause can be based on sign offs from one or more entities and the edit history of the clause. Using the identified clause states, the ODS 110 can generate 1030 a document interface displaying each document clause along with an indication of the clause state of that clause. Further, the ODS can modify 1040 the document interface to include an additional list of document clauses that are not agreed on (for example, clauses that have not been signed off on by all participating entities). In some implementations, this additional list is formatted as a to-do list and can include viewing user-specific action items for clauses the viewing user is in a position to influence.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method, comprising:
   detecting, by an online document system, a first selection of a first interface element displayed in a first edit interface, the first interface element being configured to, when interacted with, request approval of a first edit inputted via the first edit interface before the first edit is committed to a portion in a plurality of portions of a document, each portion of the plurality of portions having separate permissions associated with one or more logic rules, the one or more logic rules are configured to detect one or more portions having one or more content values exceeding a predetermined threshold content value, the separate permissions including at least one of: an edit permission and an approval permission allowing or prohibiting editing of the portion and approval of the first edit, respectively, based on the one or more content values;
   generating, by the online document system, a second interface element for display in a second edit interface, the second interface element requesting approval of the first edit; and
   modifying, by the online document system, the portion of the document based on the first edit in response to receiving a second selection of the second interface element indicating approval of the first edit corresponding to execution of a logic rule in the one or more logic rules.

2. The method of claim 1, further comprising retrieving a permission definition for the portion of the document, the permission definition to define an edit permission definition and an approval permission definition.

3. The method of claim 1, wherein the first interface element to present a user identifier associated with an approval permission to approve the first edit to the portion of the document.

4. The method of claim 1, further comprising receiving, by the online document system, the second selection of the second interface element from the second edit interface, the second interface element comprising a user identifier associated with an approval permission to approve the first edit to the portion of the document.

5. The method of claim 1, further comprising presenting, by the online document system, a clause state indicator for the portion of the document modified based on the first edit by the first edit interface or the second edit interface, the clause state indicator to indicate a negotiation status.

6. The method of claim 1, further comprising presenting, by the online document system, an edit indicator for the portion of the document by the first edit interface or the second edit interface, the edit indicator to indicate a number of times the portion of the document was modified.

7. The method of claim 1, further comprising presenting, by the online document system, an editable clause indicator for the portion of the document by the first edit interface prior to the input of the first edit for the portion of the document, the editable clause indicator to indicate the portion of the document is editable.

8. A system, comprising:
at least one circuitry; and
at least one memory operably coupled to the circuitry, the at least one memory to store instructions that when executed by the at least one circuitry causes the at least one circuitry to:
detect a first selection of a first interface element displayed in a first edit interface, the first interface element being configured to, when interacted with, request approval of a first edit inputted via the first edit interface before the first edit is committed to a portion in a plurality of portions of a document, each portion of the plurality of portions having separate permissions associated with one or more logic rules, the one or more logic rules are configured to detect one or more portions having one or more content values exceeding a predetermined threshold content value, the separate permissions including at least one of: an edit permission and an approval permission allowing or prohibiting editing of the portion and approval of the first edit, respectively, based on the one or more content values;
generate a second interface element for display in a second edit interface, the second interface element requesting approval of the first edit; and
modify the portion of the document based on the first edit in response to receiving a second selection of the second interface element indicating approval of the first edit corresponding to execution of a logic rule in the one or more logic rules.

9. The system of claim 8, wherein the at least one circuitry is configured to retrieve a permission definition for the portion of the document, the permission definition to define an edit permission definition and an approval permission definition.

10. The system of claim 8, wherein the first interface element to present a user identifier associated with an approval permission to approve the first edit to the portion of the document.

11. The system of claim 8, wherein the at least one circuitry is configured to receive the second selection of the second interface element from the second edit interface, the second interface element comprising a user identifier associated with an approval permission to approve the first edit to the portion of the document.

12. The system of claim 8, wherein the at least one circuitry is configured to present a clause state indicator for the portion of the document modified based on the first edit by the first edit interface or the second edit interface, the clause state indicator to indicate a negotiation status.

13. The system of claim 8, wherein the at least one circuitry is configured to present an edit indicator for the portion of the document by the first edit interface or the second edit interface, the edit indicator to indicate a number of times the portion of the document was modified.

14. The system of claim 8, wherein the at least one circuitry is configured to present an editable clause indicator for the portion of the document by the first edit interface prior to the first edit inputted for the portion of the document, the editable clause indicator to indicate the portion of the document is editable.

15. A non-transitory computer readable storage medium comprising instructions which, when executed by one or more processors, cause the one or more processors to:
detect a first selection of a first interface element displayed in a first edit interface, the first interface element being configured to, when interacted with, request approval of a first edit inputted via the first edit interface before the first edit is committed to a portion in a plurality of portions of a document, each portion of the plurality of portions having separate permissions associated with one or more logic rules, the one or more logic rules are configured to detect one or more portions having one or more content values exceeding a predetermined threshold content value, the separate permissions including at least one of: an edit permission and an approval permission allowing or prohibiting editing of the portion and approval of the first edit, respectively, based on the one or more content values;
generate a second interface element for display in a second edit interface, the second interface element requesting approval of the first edit; and
modify the portion of the document based on the first edit in response to receiving a second selection of the second interface element indicating approval of the first edit corresponding to execution of a logic rule in the one or more logic rules.

16. The computer readable storage medium of claim 15, wherein the one or more processors are configured to retrieve a permission definition for the portion of the document, the permission definition to define an edit permission definition and an approval permission definition.

17. The computer readable storage medium of claim 15, wherein the first interface element to present a user identifier associated with an approval permission to approve the first edit to the portion of the document.

18. The computer readable storage medium of claim 15, wherein the one or more processors are configured to receive the second selection of the second interface element from the second edit interface, the second interface element comprising a user identifier associated with an approval permission to approve the first edit to the portion of the document.

19. The computer readable storage medium of claim 15, wherein the one or more processors are configured to present a clause state indicator for the portion of the document modified based on the first edit by the first edit interface or the second edit interface, the clause state indicator to indicate a negotiation status.

20. The computer readable storage medium of claim 15, wherein the one or more processors are configured to present an edit indicator for the portion of the document by the first edit interface or the second edit interface, the edit indicator to indicate a number of times the portion of the document was modified.

\* \* \* \* \*